US008000409B2

(12) United States Patent
Chan et al.

(10) Patent No.: US 8,000,409 B2
(45) Date of Patent: *Aug. 16, 2011

(54) METHOD AND APPARATUS FOR IMPROVING POWER AMPLIFIER EFFICIENCY IN WIRELESS COMMUNICATION SYSTEMS HAVING HIGH PEAK TO AVERAGE POWER RATIOS

(75) Inventors: Wen-Yen Chan, Thornhill (CA);
Nasserullah Khan, Waterloo (CA);
Qingzhong Jiao, Nepean (CA); Xin Jin, Ottawa (CA); Nagula Tharma Sangary, Waterloo (CA); Michael Franz Habicher, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,612

(22) Filed: Jul. 30, 2010

(65) Prior Publication Data
US 2010/0291887 A1    Nov. 18, 2010

Related U.S. Application Data

(63) Continuation of application No. 12/478,812, filed on Jun. 5, 2009, now Pat. No. 7,787,566, which is a continuation of application No. 12/025,247, filed on Feb. 4, 2008, now Pat. No. 7,551,689, which is a continuation of application No. 10/781,812, filed on Feb. 20, 2004, now Pat. No. 7,333,563.

(51) Int. Cl.
*H04K 1/02* (2006.01)
*H04L 25/03* (2006.01)

(52) U.S. Cl. .................................................. 375/297
(58) Field of Classification Search .................. 375/219, 375/222, 223, 267, 296, 297, 345; 330/10; 370/318; 455/69, 126, 127.1, 522
See application file for complete search history.

(56) References Cited

U.S. PATENT DOCUMENTS
3,486,128 A    12/1969    Lohrmann
(Continued)

FOREIGN PATENT DOCUMENTS
CN    1329413    1/2002
(Continued)

OTHER PUBLICATIONS
US 6,560,446, 10/2002, Ramachandran (withdrawn).
(Continued)

*Primary Examiner* — Don N Vo
(74) *Attorney, Agent, or Firm* — Novak Druce + Quigg LLP

(57) ABSTRACT

A power management system and method for a wireless communication device generates an average desired transmit power signal based on at least one of a received signal strength indicator signal and a power control instruction signal from a base station. A power supply level adjustment signal is generated based on the data parameters of an outgoing data stream and at least one environmental information signal. A combination of the power supply level adjustment signal and the average desired transmit power or a gain control signal and an altered version of the power supply level adjustment signal is used to generate a variable power supply signal that is provided to an output amplifier block for sufficiently generating outgoing wireless device radio signals while reducing power loss in the output amplifier block.

21 Claims, 6 Drawing Sheets

U.S. PATENT DOCUMENTS

| | | | |
|---|---|---|---|
| 4,453,264 | A | 6/1984 | Hochstein |
| 4,809,339 | A | 2/1989 | Shih et al. |
| 4,849,711 | A | 7/1989 | Leis et al. |
| 5,267,262 | A | 11/1993 | Wheatley, III |
| 5,452,473 | A | 9/1995 | Weiland et al. |
| 5,467,058 | A | 11/1995 | Fujita |
| 5,485,486 | A | 1/1996 | Gilhousen et al. |
| 5,732,334 | A * | 3/1998 | Miyake ............... 455/126 |
| 5,852,630 | A | 12/1998 | Langberg et al. |
| 6,043,707 | A | 3/2000 | Budnik |
| 6,064,269 | A | 5/2000 | Ruppel et al. |
| 6,107,878 | A | 8/2000 | Black |
| 6,137,840 | A | 10/2000 | Tiedemann, Jr. et al. |
| 6,166,598 | A | 12/2000 | Schlueter |
| 6,178,313 | B1 | 1/2001 | Mages et al. |
| 6,205,127 | B1 | 3/2001 | Ramesh |
| 6,208,202 | B1 | 3/2001 | Kaufman et al. |
| 6,265,935 | B1 | 7/2001 | Kaneda et al. |
| 6,313,698 | B1 | 11/2001 | Zhang et al. |
| 6,359,504 | B1 | 3/2002 | Cozzarelli |
| 6,373,823 | B1 | 4/2002 | Chen et al. |
| 6,421,327 | B1 | 7/2002 | Lundby et al. |
| 6,445,247 | B1 | 9/2002 | Walker |
| 6,525,605 | B2 | 2/2003 | Hu et al. |
| 6,531,860 | B1 | 3/2003 | Zhou et al. |
| 6,535,066 | B1 | 3/2003 | Petsko |
| 6,566,944 | B1 | 5/2003 | Pehlke et al. |
| 6,597,925 | B1 | 7/2003 | Garcia et al. |
| 6,765,440 | B2 | 7/2004 | Chandrasekaran |
| 6,876,697 | B2 | 4/2005 | Peters et al. |
| 6,914,487 | B1 | 7/2005 | Doyle et al. |
| 6,965,676 | B1 | 11/2005 | Allred |
| 7,116,955 | B2 | 10/2006 | Schaffer et al. |
| 7,183,856 | B2 | 2/2007 | Miki et al. |
| 7,333,563 | B2 | 2/2008 | Chan et al. |
| 7,375,540 | B2 | 5/2008 | Burns et al. |
| 7,411,896 | B1 | 8/2008 | Karsi |
| 7,471,738 | B2 | 12/2008 | Chan et al. |
| 7,542,741 | B2 | 6/2009 | Rozenblit et al. |
| 7,551,689 | B2 | 6/2009 | Chan et al. |
| 7,787,566 | B2 | 8/2010 | Chan et al. |
| 7,852,968 | B2 | 12/2010 | Chan et al. |
| 7,873,119 | B2 | 1/2011 | Chan et al. |
| 7,907,920 | B2 | 3/2011 | Chan et al. |
| 2001/0026600 | A1 | 10/2001 | Mochizuki et al. |
| 2001/0048292 | A1 | 12/2001 | Wahl |
| 2002/0013157 | A1 | 1/2002 | Ichikawa |
| 2002/0080887 | A1 | 6/2002 | Jeong et al. |
| 2002/0159503 | A1 | 10/2002 | Ramachandran |
| 2002/0183028 | A1 | 12/2002 | Takahashi et al. |
| 2003/0002452 | A1 | 1/2003 | Sahota |
| 2003/0036361 | A1 | 2/2003 | Kawai et al. |
| 2003/0060193 | A1 | 3/2003 | Kurita |
| 2003/0176202 | A1 | 9/2003 | Bartl et al. |
| 2004/0100921 | A1 | 5/2004 | Khan |
| 2004/0146013 | A1 | 7/2004 | Song et al. |
| 2004/0180686 | A1 | 9/2004 | Nakayama |
| 2004/0213335 | A1 | 10/2004 | Forest et al. |
| 2004/0251962 | A1 | 12/2004 | Rosnell et al. |
| 2005/0285681 | A1 | 12/2005 | Doherty et al. |
| 2006/0046658 | A1 | 3/2006 | Cruz et al. |
| 2006/0046666 | A1 | 3/2006 | Hara et al. |
| 2007/0035285 | A1 | 2/2007 | Balakrishnan et al. |
| 2007/0139014 | A1* | 6/2007 | Girson et al. ............ 320/132 |
| 2007/0184791 | A1 | 8/2007 | Vinayak et al. |
| 2007/0258602 | A1 | 11/2007 | Vepsalainen et al. |
| 2007/0291718 | A1 | 12/2007 | Chan et al. |
| 2007/0291872 | A1 | 12/2007 | Chan et al. |
| 2009/0021303 | A1 | 1/2009 | Vinayak et al. |
| 2009/0074107 | A1 | 3/2009 | Chan et al. |

FOREIGN PATENT DOCUMENTS

| | | |
|---|---|---|
| CN | 1355967 | 6/2002 |
| CN | 1525658 A | 9/2004 |
| EP | 0 977 354 A1 | 2/2000 |
| EP | 1146636 | 10/2001 |
| JP | 6132736 | 5/1994 |
| JP | 1994069002 | 8/1994 |
| JP | 6252797 | 9/1994 |
| JP | 1155041 | 2/1999 |
| JP | 2001237722 | 8/2001 |
| JP | 2001284998 | 10/2001 |
| JP | 2004500775 | 1/2004 |
| JP | 2004048797 | 2/2004 |
| JP | 2005244996 | 9/2005 |
| WO | 0077950 | 12/2000 |
| WO | 0233844 | 4/2002 |
| WO | 02060088 | 8/2002 |
| WO | 2005053151 | 6/2005 |
| WO | 2007054609 A1 | 5/2007 |

OTHER PUBLICATIONS

Extended European Search Report and Exam Report for EP patent application No. EP 04003949.7 dated Sep. 8, 2004.

Exam Report for EP patent application No. EP 04003949.7 dated Jan. 13, 2005.

Exam Report for EP patent application No. EP 04003949.7 dated Jun. 20, 2005.

Written Opinion from Australian Patent Office for Singapore patent application No. SG 200500994-9, date of mailing Aug. 17, 2006.

Office Action from Korean Patent Office for Korean patent application No. 10-2005-0013782, date of delivery Jul. 14, 2006.

Exam Report for corresponding Singapore patent application No. SG 200500994-9, date of mailing Mar. 27, 2007.

Exam Report for corresponding Chinese patent application No. 200510009553.4 dated Apr. 4, 2008.

Canadian Search Report for corresponding Canadian patent application No. 2,497,038 dated Sep. 3, 2008.

Chinese Office Action dated Oct. 10, 2008 with English Translation, Chinese Application No. 200510009553.4.

Chinese Office Action dated May 15, 2009, Chinese Patent Application No. 200510009553.4.

Larson et al. "Device and Circuit Approaches for Improved Wireless Communications Transmitters", Oct. 1, 1999, IEEE Personal Communications, IEEE Communications Society, University of California, San Diego, pp. 18-23.

Co-pending U.S. Appl. No. 11/763,068, "Control of Switcher Regulated Power Amplifier Modules", filed Jun. 14, 2007.

Co-pending U.S. Appl. No. 11/763,099, "Input Drive Control for Switcher Regulated Power Amplifier Modules", filed Jun. 14, 2007.

Co-pending U.S. Appl. No. 12/785,009, "Input Drive Control for Switcher Regulated Power Amplifier Modules", filed May 21, 2010.

United States Office Action dated Aug. 2, 2010, U.S. Appl. No. 11/763,068.

United States Office Action dated Apr. 14, 2010, U.S. Appl. No. 11/763,099.

United States Office Action Response dated Jul. 14, 2010, U.S. Appl. No. 11/763,099.

Co-pending U.S. Appl. No. 12/784,971, "Control of Switcher Regulated Power Amplifier Modules", filed May 21, 2010.

Co-pending U.S. Appl. No. 12/784,932, "Method and Apparatus for Optimizing Transmitter Power Efficiency", filed May 21, 2010.

United States Notice of Allowance dated Nov. 24, 2010, U.S. Appl. No. 11/763,068.

Co-pending U.S. Appl. No. 12/842,126, "Method of Power Amplifier Switching Power Control Using Post Power Amplifier Power Detection", filed Jul. 23, 2010.

United States Office Action Response dated Sep. 27, 2010, U.S. Appl. No. 11/763,068.

Indian Office Action, Indian Patent Application No. 358/DEL/2005, dated Nov. 22, 2010.

United States Notice of Allowance dated Oct. 1, 2010, U.S. Appl. No. 11/763,099.

Canadian Office Action for corresponding Canadian Patent Application No. 2,497,038, dated Jul. 7, 2009.

United States Office Action, U.S. Appl. No. 12/785,009, dated Dec. 28, 2010.

Maksimovic D. et al., "60% Efficient 10-GHz Power Amplifier with Dynamic Drain Bias Control", IEEE Transactions on Microwave Theory and Techniques, IEEE Service Center, Piscataway, NJ, US, vol. 52, No. 3, Mar. 1, 2004, pp. 1077-1081, XP011108898.

Office action in JP Patent App. No. 2008-525354; mailed Feb. 25, 2011.

Office action in JP Patent App. No. 2008-525353; mailed Feb. 25, 2011.

United States Office Action, U.S. Appl. No. 12/784,971, dated Apr. 13, 2011.

* cited by examiner

METHOD AND APPARATUS FOR IMPROVING POWER AMPLIFIER EFFICIENCY IN WIRELESS COMMUNICATION SYSTEMS HAVING HIGH PEAK TO AVERAGE POWER RATIOS

CROSS REFERENCE TO RELATED APPLICATIONS

This application is a continuation of U.S. patent application Ser. No. 12/478,812, filed on Jun. 5, 2009, now issued to patent as U.S. Pat. No. 7,787,566, which is a continuation of U.S. patent application Ser. No. 12/025,247, filed on Feb. 4, 2008, now issued to patent as U.S. Pat. No. 7,551,689, which is a continuation of U.S. patent application Ser. No. 10/781,812, filed on Feb. 20, 2004, now issued to patent as U.S. Pat. No. 7,333,563. The entire contents of application Ser. No. 12/478,812, application Ser. No. 12/025,247 and of application Ser. No. 10/781,812 are hereby incorporated by reference.

FIELD OF THE INVENTION

This invention relates to wireless communication devices. More particularly, it relates to a method and apparatus for improving power amplifier efficiency in wireless communication systems having variable transmit power in a large range and/or high peak to average power ratios.

BACKGROUND OF THE INVENTION

Handheld wireless communication devices and other types of wireless transmitters are typically powered by one or more internal batteries. A major performance criterion for such devices is their battery life, which is typically defined as the time period for which the battery will power the device on a single charge. A large portion of battery power is consumed in a power amplifier section of the wireless device's transmitter. The power amplifier section amplifies the power of a signal to be transmitted from a comparatively low internal power level to a substantially higher power level required for wireless communication with remote base stations and other devices. Improving the power amplifier efficiency, or more generally the transmitter efficiency, would reduce power consumption and increase battery life.

Accordingly, there is a need for a system that provides improved power amplifier efficiency, or more generally, improved transmitter efficiency.

SUMMARY OF THE INVENTION

The invention provides a power management system that supplies a variable power supply signal to a power amplification stage of an output power amplification block of a wireless communications device. The desired power of an amplified transmission signal, that is produced by the power amplification stage, is estimated and used to vary the power supply voltage that is provided to the output power amplifier, to reduce power loss in the power amplification stage. Advantageously, the estimated desired power is adjusted according to at least one environmental information signal. For instance, at least one of a temperature information signal, a battery condition signal and the operating frequency of the wireless communications device can be used to augment the estimated desired power level to provide more accurate control of the power supply signal.

In a first aspect, the invention provides a power management system for providing a variable power supply signal to an output power amplifier block in a wireless communication device. The power management system comprises an average power and gain control block for providing a gain control signal and an average desired transmit power signal, the average desired transmit power signal being generated in response to at least one of a power control instruction signal and a received signal strength indicator signal; an environmental sensor unit for providing at least one environmental information signal; a power supply level adjustment generator connected to the environmental sensor unit for providing a power supply level adjustment signal in response to a data parameter indication of a baseband outgoing data stream to be transmitted by the wireless communication device and the at least one environmental information signal; and, a power supply means connected to the average power and gain control block for providing the variable power supply signal to the output power amplifier block in response to a combination of the average desired transmit power signal and the power supply level adjustment signal or a combination of the gain control signal and an altered version of the power supply level adjustment signal.

The environmental sensor unit comprises at least one of a temperature sensor for providing a temperature information signal as part of the at least one environmental information signal, the temperature information signal being related to the temperature of the hardware of the wireless communications device; and, a battery condition sensor for providing a battery condition information signal as part of the at least one environmental information signal, the battery condition information signal being related to a battery used to power the wireless communication device. A frequency information signal related to the frequency at which the baseband outgoing data stream will be transmitted may also be included as part of the environmental information signal.

The average power and gain control block may comprise an average power level block for generating the average desired transmit power signal, and a gain control block connected to the average power level block for generating the gain control signal. Further, the power supply means includes a power supply control block for providing a power control signal and a switch converter connected to the power supply control block for providing the variable power supply signal in response to the power control signal, and wherein the power supply means is connected to the power supply level adjustment generator for providing the variable power supply signal to the output power amplifier block in response to a combination of the average desired transmit power signal and the power supply level adjustment signal.

Alternatively, the power supply level adjustment generator can produce an altered version of the power supply level adjustment signal according to the gain control signal provided by the average power and gain control block, and the power supply means comprises: a summer connected to the average power and gain control block and the power supply level adjustment generator for summing the gain control signal and the altered version of the power supply level adjustment signal to generate a first power control signal; a clipper connected to the summer for receiving the first power control signal and generating a second power control signal; a switch converter connected to the clipper for receiving the power control signal and generating the variable power supply signal; and, a reverse mapper connected to the power supply level adjustment generator and the average power and gain control block for receiving an environmental signal and an altered version of the gain control signal respectively and generating a clipper adjustment signal, the reverse mapper also being connected to the clipper for providing the clipper adjustment signal to the clipper for adjusting the performance of the clipper.

Preferably, the power supply means is configured to maintain the variable power supply signal above a minimum voltage level. Further, the power supply level adjustment generator may be implemented by a plurality of look-up tables, wherein one look-up table is provided for each environmental information signal and the data parameter indication, and the outputs of each look-up table are combined to generate the power supply level adjustment signal. Alternatively, at least one of the look-up tables may be implemented by a corresponding formula.

Further, the power supply block is calibrated by:
(i) transmitting the wireless device radio signals at a constant power level from the wireless communication device while monitoring an Adjacent Channel Power Ratio (ACPR);
(ii) reducing the magnitude of the variable power supply signal while maintaining constant output power in the wireless device radio signals;
(iii) recording the magnitude of the variable power supply signal when the ACPR has increased to a pre-specified design target;
(iv) increasing the output power of the wireless device radio signals and repeating steps (i) to (iii) for several output power levels; and,
(v) computing an ideal transfer function for deriving the power control signal for controlling the switch converter.

The power supply block may further be calibrated by:
(vi) repeating steps (i) to (v) for several different wireless communication devices to obtain an average transfer function; and,
(vii) performing curve fitting on the average transfer function.

Further, the power supply level adjustment generator is calibrated by:
(viii) loading the power supply level adjustment generator with a value which causes the output power amplifier block to operate at a lowest transmission power point;
(ix) calibrating the transmission power until the output power of the output power amplifier block slightly exceeds a target power determined for a power supply voltage level;
(x) interpolating the output value of the average power level block and loading this interpolated output value, after adjustment by a reverse mapper, into the power supply level adjustment generator;
(xi) adjusting the transmission power level to a value slightly below the target power; and,
(xii) increasing the value of the transmission power level and repeating steps (viii) to (xi) until a maximum specified transmission power point is reached.

In another aspect, the invention provides a method of supplying a variable power supply signal to an output power amplifier block in a wireless communications device that receives an incoming data stream from a base station radio signal and transmits an outgoing data stream in a wireless device radio signal, the method comprising:
(a) detecting at least one of a signal strength of the base station radio signal to produce a received signal strength indicator signal, and a power control instruction signal in the base station radio signal;
(b) generating an average desired transmit power signal in response to at least one of the received signal strength indicator signal and the power control instruction signal;
(c) generating at least one environmental information signal for obtaining information about the environment of the wireless communications device;
(d) generating a power supply level adjustment signal based on a data parameter indication of a baseband outgoing data stream and the at least one environmental information signal; and,
(e) combining one of the average desired transmit power signal and the power supply level adjustment signal or a gain control signal and an altered version of the power supply level adjustment signal to generate the variable power supply signal, the gain control signal being derived based on at least one of the received signal strength indicator signal and the power control instruction signal, and providing the variable power supply signal to the output power amplifier block.

Step (c) of the method preferably includes at least one of:
(i) generating a temperature information signal related to the temperature of the hardware of the wireless communications device and providing the temperature information signal as part of the at least one environmental information signal;
(ii) generating a battery condition information signal related to a battery used to power the wireless communications device and providing the battery condition information signal as part of the at least one environmental information signal; and,
(iii) generating a frequency information signal related to the frequency at which the outgoing data stream is transmitted and providing the frequency information signal as part of the at least one environmental information signal.

Step (e) of the method may include:
(iv) combining the average desired transmit power signal and the power supply level adjustment signal to generate a power control signal; and,
(v) converting the power control signal into the variable power supply signal.

Alternatively, step (e) of the method may include:
(iv) adding an altered version of the power supply level adjustment signal and the gain control signal to provide a first power control signal, the altered version of the power supply level adjustment signal being generated based on the derivation of the gain control signal;
(v) clipping the first power control signal to provide a second power control signal; and,
(vi) converting the second power control signal into the variable power supply signal.

Step (v) includes may further preferably include providing a clipper adjustment signal to adjust clipping parameters, the clipper adjustment signal being generated in response to a combination of an environmental signal and an altered version of the gain control signal. In addition, the method may further comprise maintaining the variable power supply signal above a minimum voltage level.

BRIEF DESCRIPTION OF THE DRAWINGS

For a better understanding of the invention and to show more clearly how it may be carried into effect, reference will now be made, by way of example only, to the accompanying drawings which show exemplary embodiments of the invention and in which.

DETAILED DESCRIPTION OF EXEMPLARY EMBODIMENTS

Figure 1:
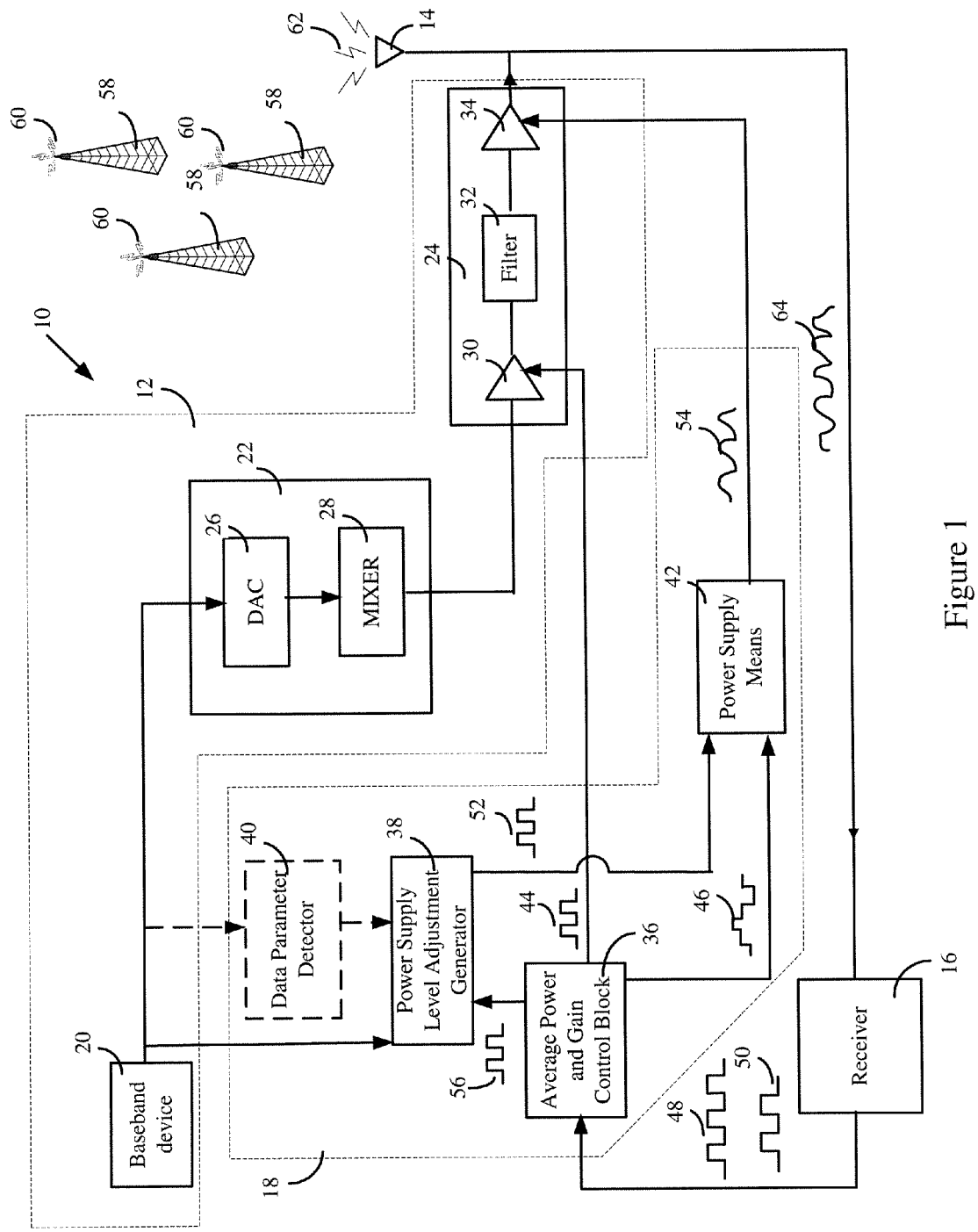
FIG. 1 is a block diagram of an exemplary embodiment of a power management system for a wireless communications device.

In the following detailed description, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

As is well understood, a wireless communications device generates an internal data signal that is transmitted using a radio transmitter. The data signal is typically a comparatively low frequency signal that is generally referred to as a baseband signal. The baseband signal is mixed with a carrier signal having a substantially higher frequency to produce a transmission signal. The transmission signal is amplified in one or more amplification stages of an output power amplification block to produce an amplified transmission signal that is sufficiently powered so that it is received with little or no data loss at a remote base station or another communication device.

Typically, the amplification stages of the output power amplification block include a pre-amplification stage for producing a pre-amplified transmission signal and a power amplification stage for producing the amplified transmission signal. The amplification level of the pre-amplification stage is controlled using a gain control block which is typically implemented via a gain controller. The amplification level is generally set using various open and/or closed loop methods for determining the desired power level of the amplified transmission signal. The pre-amplified transmission signal is then amplified again in the power amplification stage to generate the amplified transmission signal. The gain of the power amplification stage is typically fixed but may vary with the power supply level. The power amplification stage is powered so that it can produce an amplified transmission signal that has the instantaneous maximum power that may be required for transmission.

The above power supply scheme for the power amplification stage may be acceptable in a wireless device in which the amplified transmission signal does not have a large dynamic range of power levels, or in which the amplified transmission signal has a very low peak-to-average power ratio (PAPR). However, in many cases, the amplified transmission signal has a large dynamic range of power levels, in order to accommodate a signal that has a high PAPR, or to accommodate different types of signals that may have different desired power levels and different PAPRs. The power amplification stage must be capable of generating an amplified transmission signal such that the highest instantaneous power level desired for any data type or data rate of the baseband data that is present in the amplified transmission signal is always accommodated. Accordingly, in conventional power management schemes, the power amplification stage is always provided with a maximum amount of power supply voltage that is sufficient for accommodating a specified maximum instantaneous power level. However, much of the time, the actual instantaneous power level of the amplified transmission signal may be well below the specified maximum instantaneous power level thereby leading to inefficient operation of the power amplification stage during signal transmission. The excess power supplied to the power amplifier is dissipated as heat or otherwise lost.

The invention provides a power management system that supplies a variable power supply signal to a power amplification stage of an output power amplification block of a wireless communications device. The desired power of an amplified transmission signal, that is produced by the power amplification stage, is estimated and used to vary the power supply level to the power amplifier to reduce power loss in the power amplification stage. Advantageously, to increase accuracy, the estimated desired power is also based on at least one environmental information signal as is further discussed below.

Reference is first made to FIG. 1, which shows a block diagram of a wireless communications device 10 having a data transmission block 12, an antenna 14, a receiver 16 and a power management system 18. The wireless communications device 10 may be any type of wireless communications device, such as an e-mail enabled personal data assistant, a cellular phone, a portable computer, etc. FIG. 1 shows a first exemplary embodiment of the power management system 18 according to the invention; other embodiments are shown in later Figures.

The data transmission block 12 includes a baseband device 20, an up-conversion block 22, and an output power amplification block 24. The up-conversion block 22 includes a digital-to-analog converter (DAC) 26 and a mixer 28. The output power amplification block 24 includes a pre-amplifier 30, a filter 32 (which is optional), and a power amplifier 34. The pre-amplifier 30 and the filter 32 implement the pre-amplification stage and the power amplifier 34 implements the power amplification stage. The receiver 16 includes a power control data detector, as is commonly known to those skilled in the art, for providing power control information for the output power amplification block 24.

The power management system 18 includes an average power and gain control block 36, a power supply level adjustment generator 38, a data parameter detector 40 (which is optional), and a power supply means 42. The average power and gain control block 36 provides a gain control signal 44 to the pre-amplifier 30 and an average desired transmit power signal 46 to the power supply means 42. The gain control signal 44 is provided to the pre-amplifier 30 to control the gain of the pre-amplifier 30. The average desired transmit power signal 46 is generated based on at least one of a power control instruction signal 48 and a received signal strength indicator signal 50 that is provided by the receiver 16 based on signals received by the wireless communications device 10.

The power supply means 42 also receives a power supply level adjustment signal 52 from the power supply level adjustment generator 38 and combines the average desired transmit power signal 46 and the power supply level adjustment signal 52 to provide a variable power supply signal 54 to the power amplifier 34. Preferably, this operation is in response to input changes including the power control instruction signal 48 which is updated every 1.25 ms. The power supply level adjustment generator 38 determines the additional adjustment provided by the power supply level adjustment signal 52 based on the data type and data rate of the data that is to be transmitted by the communications device 10. The power supply level adjustment signal 52 can also preferably varied according to other parameters such as environmental parameters and the like that are described in further detail below.

The wireless communication device 10 communicates with remote base stations 58 and other devices through radio signals transmitted and received by the antenna 14. The base stations 58 transmit base station radio signals 60 that are received by the antenna 14 and processed by the receiver 16 to extract data from them, as is further described below. This data path may be referred to as the forward link. The wireless communications device 10 also transmits wireless device radio signals 62 to the base stations 58 from the antenna 14. The data path that begins at the wireless communications device 10 and ends at the base stations 58 may be referred to as the reverse link.

In the forward link, the antenna 14 detects and receives one of the base station radio signals 60 and provides a received signal 64 to the receiver 16. The receiver 16 will typically include several functional blocks, as is commonly known to those skilled in the art, to convert the received signal 64 into a digital signal and to process the received signal 64 to remove noise, to perform down-conversion or demodulation, and the like. In many communications systems, including the IS-95 Code Domain Multiple Access (CDMA) standard and subsequent communications standards, the base stations 58 may transmit a series of power control instructions in the power control instruction signal 48 as part of the received signal 64. The power control instruction signal 48 instructs the power management system 18 to increase or decrease the power of the transmitted wireless device radio signals 62. In one standard, the power control instruction signals 48 are sent in the form of data bits and may be received at a rate of 800 power control bits per second. One of the base stations 58 will send the power control instruction signal 48 based on the quality of the wireless device radio signals 62 received by the base station 58 from the wireless communications device 10. If the wireless device radio signal 62 is received with sufficient power to allow it to be decoded and used, then the base station 58 may instruct the wireless communications device 10 to maintain or reduce the power of the wireless device radio signal 62. If the wireless device radio signal 62 is marginal or is too weak to be used, the base station 58 may instruct the wireless communications device 10 to increase the power of the wireless device radio signal 62. This type of power control is typically referred to as reverse link closed loop power control.

Some wireless communication systems, including systems which operate under the IS-95 CDMA standard and subsequent standards, may also use reverse link open loop power control. Open loop power control is performed by measuring the signal strength of the base station radio signal 60 received by the wireless communications device 10. If the signal strength of the base station radio signal 60 is high, then it is assumed that the wireless communications device 10 may transmit the wireless device radio signal 62 with lower strength and conversely, if the signal strength of the base station radio signal 62 is low, then it is assumed that the wireless device radio signal 62 must be stronger to reach the base radio station 58 in a usable form. This open loop power control is based on the assumptions that: (i) the base radio station 58 is transmitting the base station radio signal 60 with approximately constant signal strength; and, (ii) the attenuation of the base station radio signal 58 in the forward link will be about the same as the attenuation of the wireless device radio signal 62 in the reverse link.

The embodiments of the invention described herein are configured to operate according to an open and closed loop power control scheme. The embodiments of the invention can be configured to operate according to an open loop power control scheme by having the receiver 16 measure the signal strength of the received signal 64 to provide the received signal strength indicator signal 50. Accordingly, the received signal strength indicator signal 50 corresponds to the signal strength of the base station radio signal 60. In this case, the power control instructions can be a combination of the open loop power instructions (derived from the received signal strength indicator signal 50) and closed loop power control bits that are encoded in the control channel in the received base station radio signals 60. In the absence of closed loop corrections the power control is based solely on the received signal strength indicator signal 50.

Figure 2:
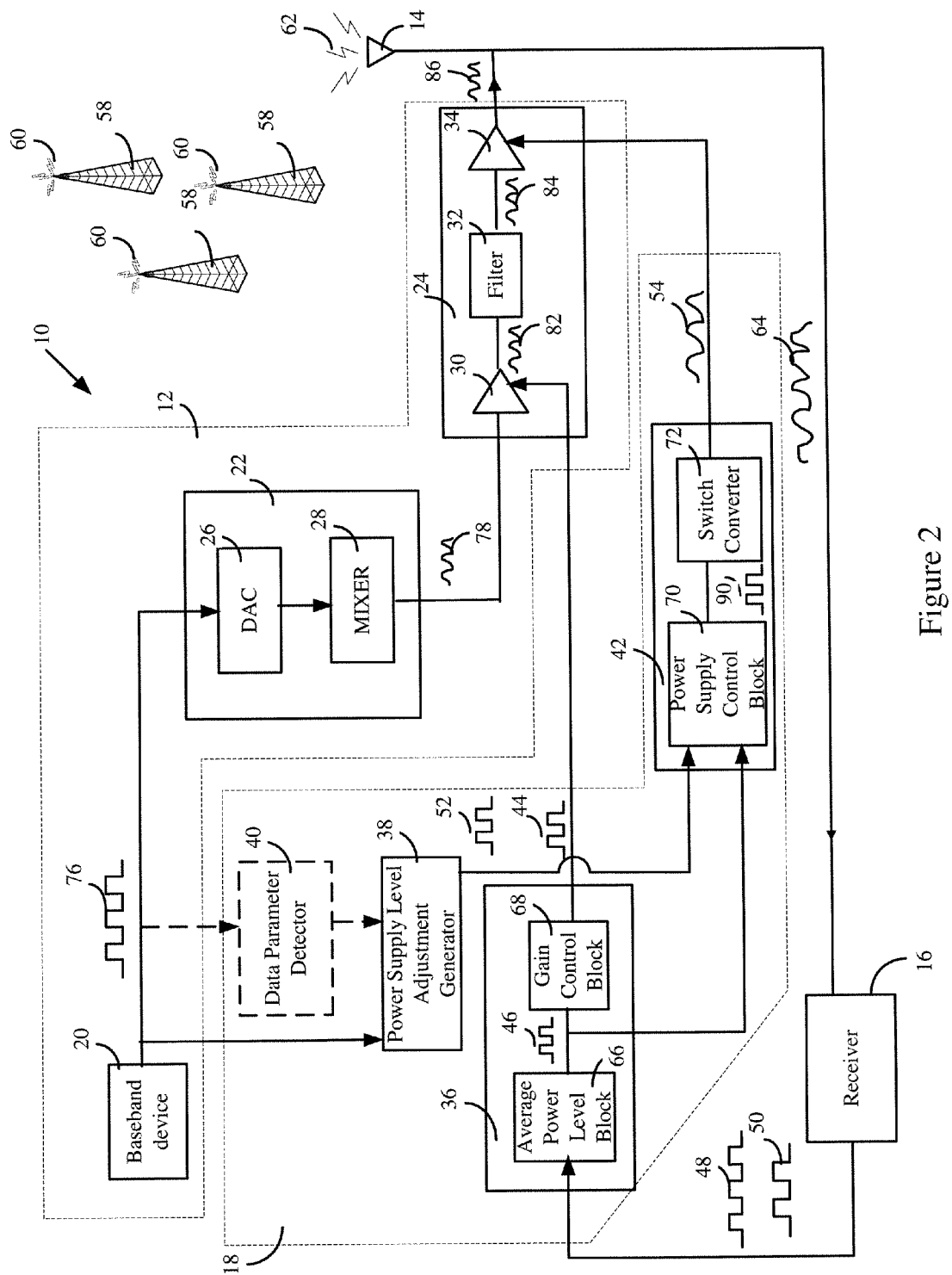
FIG. 2 is more detailed block diagram of the power management system of FIG. 1.

Various detailed embodiments of the power management system 18 that operate according to an open and closed loop power control scheme will now be discussed. Components that are identified with similar numbers in each of the embodiments work in a similar fashion unless otherwise specified. Referring now to FIG. 2, the average power and gain control block 36 includes an average power level block 66 and a gain control block 68. Further, the power supply means 42 includes a power supply control block 70 and a switch converter 72.

The receiver 16 extracts the power control instruction signal 48 and passes the signal 48 to the average power level block 66. The receiver 16 also generates the received signal strength indicator signal 50 and passes the signal 50 to the average power level block 66. The average power level block 66 combines the power control instruction signal 48 and the received signal strength indicator signal 50 to calculate an average desired transmit power signal 46 for the wireless device radio signal 62. Typically, the received signal strength indicator signal 50 is used to set an initial power level when radio communication is established between the wireless communications device 10 and one of the base stations 58. As the wireless communications device 10 is moved from place to place, it may communicate with different base stations 58 and a seamless "hand-off" between the base stations 58 is desirable. To facilitate this "hand-off", when the wireless communications device 10 initially begins communicating with a new base station 58, the average power level block 66 relies on the received signal strength indicator signal 50 to approximate the average desired transmit power signal 46. During ongoing communication between the wireless communications device 10 and the base stations 58, the average desired transmit power signal 46 is refined as instructions in the power control instruction signal 48 are received from the base stations 58. The power control bits are "up" and "down" instructions which are time integrated and added to the open loop power. Over time, the average desired transmit power signal 46 may be refined quite precisely to provide a balance between sufficient power so that the wireless device radio signal 62 may be received by one of the base stations 58 in a usable form (i.e. it is not corrupted or undecodable due to interference from other signals or due to having a low signal strength) and so that the wireless device radio signal 62 does not interfere with other devices communicating with the base station 58 or other communication devices.

The baseband device 20 generates a baseband outgoing data stream 76 to be transmitted to one of the base stations 58. Depending on the type of service that the baseband device 20 supports, the outgoing data stream 76 may include only one type of data or may have different types of data at different times. For example, some wireless communication devices provide multiple functions including e-mail communication, text messaging, voice communication and other extended services. Different services may use different encoding and modulation methods that have different PAPR characteristics. For example, in CDMA, even low data rate traffic has a high PAPR after data modulation. As the data rate increases, the PAPR increases further. The data parameter detector 40 detects the type of data in the baseband outgoing data stream 76 in real-time and provides the data parameter indication to the power supply level adjustment generator 38. Alternatively, and more preferably, the data parameter indication can be provided directly to the power supply level adjustment generator 38 by the baseband device 20 in real-time. Hence, the solid arrow connecting the baseband device 20 to the power supply level adjustment generator 38 and the use of dotted lines for the data parameter detector 40 and the corresponding connections. The data parameter indication includes information on the type of data, the data modulation and the data rate in the baseband outgoing data stream 76.

The baseband outgoing data stream 76 is processed by the up-conversion block 22 to convert it into a corresponding analog output signal 78. The DAC 26 first converts the baseband outgoing data stream 76 into an analog signal. The analog signal is then mixed with a carrier frequency by the mixer 28 to produce the analog output signal 78 which is now in the radio frequency range rather than the baseband. The mixing may be accomplished in a single step or in multiple steps, depending on the implementation, as is commonly known by those skilled in the art. Filtering may also be used. The carrier frequency is determined by the communications standard under which the wireless communications device 10 operates, which is well understood by those skilled in the art. In addition, it should be noted that many wireless devices, including the exemplary wireless communications device 10, are capable of transmitting a wireless device radio signal 62 in more than one frequency band, and within more than one channel within each frequency band.

The power supply level adjustment generator 38 uses the data parameter indication of the baseband outgoing data stream 76 to determine the power supply level adjustment signal 52. In the present embodiment, the power supply level adjustment generator includes a PAPR mapper which may be implemented by a look-up table. The look-up table is a discrete look-up table that is pre-computed by conducting tests on a prototype wireless communication device. Specifically, a value for a data parameter is selected, such as a particular data rate test value, and given a fixed power supply level for the power amplifier 34, the headroom is observed. A power supply level adjustment value is then selected to reduce the headroom to a minimal level. The adjustment value is then entered into the look-up table and associated with the particular data rate test value. During operation, the data parameter indication (i.e. data type, data rate and data modulation) are then used as indices into the look-up table to look up a value for the power supply level adjustment signal 52. The power supply level adjustment signal 52 typically has a higher than nominal value if the data type requires a high data bandwidth for transmission. The power level adjustment signal 52 can also be varied based on environmental factors which are described in further detail below. The power level adjustment signal 52 is also adjusted at the upper and lower edges of the frequency band in which the wireless device radio signals 62 are transmitted due to the characteristics of the transmit chain. For exemplary purposes, the power level adjustment signal 52 may range from 0 to 9 dB depending on the data type at a slew rate of 800 dB/second.

Typically, the manufacturer or vendor of the wireless communications device 10 will configure a PAPR mapper in the power supply level adjustment generator 38 to provide suitable values for the power level adjustment signal 52 for different data types, data modulation and data rate as well as other parameters that are further described below. The PAPR mapper is discussed in further detail below. This is accomplished by following a calibration method that is described in further detail below.

In an alternative embodiment of the invention, the PAPR mapper may be implemented using a formula based on the relationship between the various inputs to the power supply level adjustment generator 38 and the corresponding value of the power level adjustment signal 52 rather than using a look-up table.

The average desired transmit power signal 46 is supplied to the gain control block 68, which converts the average desired transmit power signal 46 into a gain control signal 44. The gain control block 68 may be implemented as a look-up table that has been calibrated to achieve a desired average transmitted power level at the antenna 14 that is in accordance with the average desired transmit power signal 46. The look-up table in the gain control block 68 compensates for both non-linearities in the control characteristic of the pre-amplifier 30 and the gain variation of the power amplifier 34 that is caused by the change in the power supply voltage level that is provided to the power amplifier 34. The content of the look-up table is written during factory calibration of the wireless communications device 10 based on the received signal strength indicator signal 50 and the observed transmitter power at the device's antenna port. Gain values in the look-up table are calculated based on the received signal strength indicator signal 50 which are then offset by the control bits in the power control instruction signal 48. During operation, linear interpolation can be performed for values within the table.

The pre-amplifier 30 receives the analog output signal 78 and amplifies under the control of the gain control signal 44 to produce a pre-amplified transmission signal 82. The gain control signal 44 is generated so that an increase or decrease in the average desired transmit power signal 46 produces a log-linear increase or decrease in the amplification of the output power amplifier block 24, through adjusting the gain of the pre-amplifier 30.

The pre-amplified transmission signal 82 is filtered by the filter 32 to produce a filtered transmission signal 84. The filter 32 removes noise that is introduced into the pre-amplified transmission signal 82 by the pre-amplifier 30 and prior stages of the wireless communications device 10. The specific characteristics of the filter 32 such as the passband frequency range, the filter order and the like, will depend on the specific pre-amplifier 30 and the prior stages that are used in the wireless communications device 10. A skilled person in the art will be capable of selecting appropriate parameters for the filter 32. It should be noted that the filter 32 is optional and may be omitted in cases where the pre-amplified transmission signal 82 is sufficiently free of noise.

The filtered transmission signal 84 is amplified by the power amplifier 34 to provide an amplified transmission signal 86. The amplified transmission signal 86 is transmitted by the antenna 14 as the wireless device radio signal 62. The amplified transmission signal 86 has sufficient power so that it may be received by any one of the base stations 58 in a form that is receivable and decodable to re-create the baseband outgoing data stream 76.

The average and peak power levels of the amplified transmission signal 86 vary over time. As the average desired transmit power signal 46 varies, the amplitude of the pre-amplified transmission signal 82 will vary. The power amplifier 34 will typically have a constant gain factor and accordingly, the amplified transmission signal 86 will also have a time-varying average power level. The power amplifier 34 may also have a gain factor that varies with the power supply voltage level, but this variation may be compensated using calibration tables as is well known in the art. When the analog output signal 78 has a high PAPR, the instantaneous power level of the amplified transmission signal 86 will also vary. At any point in time, the power amplifier 34 requires sufficient power to operate its internal electronics and to produce the amplified transmission signal 86. When the amplified transmission signal 86 has its maximum instantaneous power level (i.e. during a maximum peak of the amplified transmission signal 86 which corresponds with the highest possible value for the average desired transmit power signal 46), the power amplifier 34 must still have at least some headroom to ensure that the amplified transmission signal 86 is not clipped at its peaks. One reason for the significant power loss that occurs in the output power amplifier block 24 of the wireless communication device 10 is that the amplified transmission signal 86 is rarely at this maximum level and is usually at a much lower power level. The excess headroom between the power supply level provided to the power amplifier 34 and the magnitude of the amplified transmission signal 86 is dissipated as heat.

To avoid this power loss, the power supply level adjustment signal 52 and the average desired transmit power signal 46 are combined by the power supply control block 70 to generate a power control signal 90, which may be a pulse width modulated or pulse density modulated signal. The power control signal 90 is converted into the variable power supply signal 54, which is an analog signal, by the switch converter 72. The variable power supply signal 54 is the source of power supply for the power amplifier 34. The variable power supply signal 54 has a magnitude such that there is a small, yet sufficient, amount of headroom above the maximum instantaneous power required to produce the amplified transmission signal 86 with a desired quality and for the power amplifier 34 to sufficiently operate its internal electronics. An exemplary value for the required headroom is on the order of 1 to 3 dB. As manufacturing consistency increases for manufacturing the various components of the wireless communications device 10 and the power management system 18, the headroom can be reduced.

Figure 3:
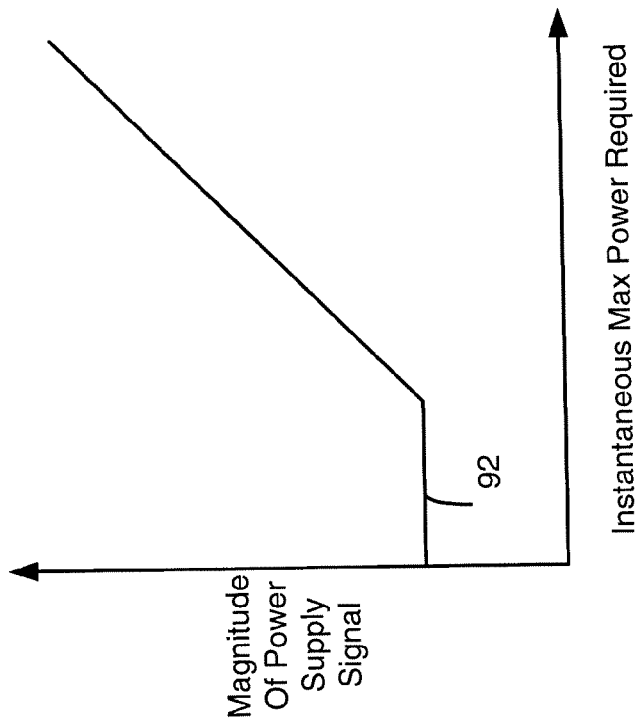
FIG. 3 is a graph illustrating the relationship between the instantaneous maximum power required by a power amplifier of a wireless communication device and the power supply provided to the power amplifier.

Referring now to FIG. 3, shown therein is a graph of an exemplary relationship between the instantaneous maximum power required by the power amplifier 34 to produce the amplified transmission signal 86 and the variable power supply signal 54. This relationship may vary depending on the implementation of the power management system 18 and the components used in the wireless communications device 10. The variable power supply signal 54 is generally slightly greater than a minimum voltage level 92 required by the power amplifier 34 at any point in time to produce the amplified transmission signal 86 with a predefined required quality. The variable power supply signal 54 will vary in time, corresponding to changes in the average desired transmit power signal 46 and changes in the data parameter indication of the baseband outgoing data stream 76 being transmitted by the wireless communications device 10. In another embodiment of the power management system 18, the variable power supply signal 54 will also preferably vary due to changes in the environment of the wireless communications device 10 (such as temperature), changes in condition of the battery that powers the wireless communications device and changes in the frequency range in which the wireless device radio signal 62 is being transmitted.

As previously mentioned, the variable power supply signal 54 has a minimum voltage level 92, which is selected to ensure that even when the instantaneous maximum power required by the power amplifier 34 to generate the amplified transmission signal 86 is low, sufficient power is supplied to the power amplifier 34 to keep it stable and to keep its internal electronics functioning. The minimum voltage level 92 may be maintained by the power supply control block 70 (which can maintain the power control signal 90 above the minimum voltage level 92) or the switch converter 72 which can directly maintain the variable power supply signal 54 above the minimum voltage level 92. An exemplary range of values for the minimum voltage level is 0.9 to 1.4 Volts depending on the design of the power amplifier 34.

The power management system 18 reduces the headroom between the level of the variable power supply signal 54 that is supplied to the power amplifier 34 and the supply power required for the power amplifier 34 to generate the amplified transmission signal 86 without clipping. This reduction in headroom reduces the amount of power dissipated in the power amplifier as heat. Overall, the reduced power loss can substantially improve the power efficiency and battery life for the wireless communications device 10, since one of the largest areas of power loss in many wireless devices is excess power headroom in the power amplifier.

The power management system 18 may be modified in various ways within the scope of the invention. For instance, in some cases, it may be desirable to apply an analog power supply signal to the switch converter 72. To do so, a DAC may be coupled between the power supply control block 70 and the switch converter 72. This is done when the switch converter control 72 is analog. In addition, it may be desirable to filter high frequency noise from the variable power supply signal 54, particularly if a DAC is used to produce an analog power supply signal. This may particularly be required if a delta-sigma converter is used to make the D/A conversion, rather than a linear DAC. The filter in this case may be inserted at the input of the switch converter 72.

In another alternative embodiment of the invention, it may be desirable to insert a buffer (not shown) to temporally align the variable power supply signal 54 and the filtered transmission signal 84 at the power amplifier 34 (i.e. the supply voltage to the power amplifier 34 is preferably updated at the same rate as the updating of the gain control signal 44). If the data path between the output of the baseband device 20 and the input of the power supply control block 70 delays the variable power supply signal 54 in comparison to the arrival of the data at the input of the power amplifier 34, it is possible that at times, the power amplifier 34 may not have sufficient headroom to produce the amplified transmission signal 86. To synchronize the variable power supply signal 54 and the filtered transmission signal 84, a data buffer (not shown) may be inserted between the baseband device 20 and the DAC 26, after the point at which the baseband device 20 is connected to the power management system 18. The buffer may be configured to introduce an appropriate delay, based on the delay introduced by the various elements of the power management system 18.

Figure 4:
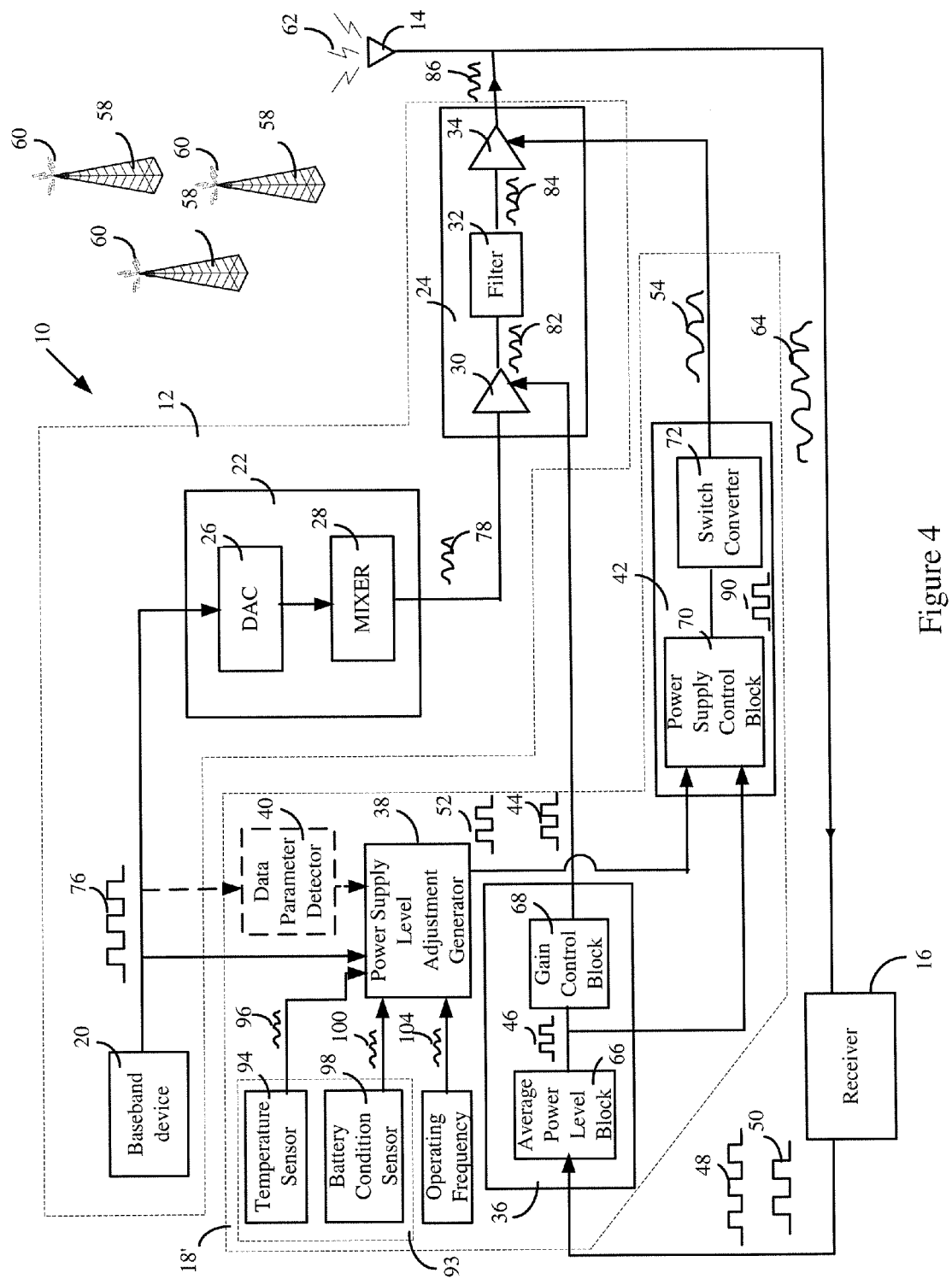
FIG. 4 is a block diagram of another embodiment of a power management system for a wireless communications device.

Referring now to FIG. 4, shown therein is an alternative embodiment of a power management system 18' which includes an environmental sensor unit 93 that is connected to the power supply level adjustment generator 38 for providing at least one environmental information signal. The environmental sensor unit 93 includes one or more environmental sensors for sensing variations in parameters that can affect the characteristics of the power amplifier 34 and hence the level of the variable power supply signal 54. For instance, the level of the variable power supply signal 54 in response to the ambient temperature of the wireless communications device 10, the condition of the battery that powers the wireless communications device 10 and/or the frequency at which the wireless device radio signal 62 is transmitted.

The environmental sensor unit 93 can include a temperature sensor 94 for sensing the ambient temperate of the hardware of the wireless communications device 10 and provide a temperature information signal 96 to the power supply level adjustment generator 38. The temperature information signal 96 will preferably be in a digital form. If the temperature sensor 94 provides analog temperature information, an analog-to-digital converter (ADC) may be coupled between the temperature sensor 94 and the power supply level adjustment generator 38 to convert the analog temperature information signal 96 into a digital temperature information signal. The temperature information signal 96 may be passed to the power supply level adjustment generator 38 using shared memory or any other data transfer mechanism commonly known to those skilled in the art.

The environmental sensor unit 93 can include a battery condition sensor 98 for sensing the charge level of the battery that is used to power the wireless communications device 10 to provide a battery condition information signal 100 to the power supply level adjustment generator 38. As in the case of the temperature sensor 94, an ADC may be used to convert an analog battery condition information signal into a corresponding digital battery condition information signal. Further, the digital battery condition information signal 100 may be passed to the power supply level adjustment generator 38 using techniques known to those skilled in the art. The battery condition is sensed so that the power supply level of the power amplifier 34 can be increased in the event that the analog output signal 78 that is passing through the output power amplifier block 24 has a high PAPR. In this case, adjustments are made to the power supply level adjustment signal 52 to compensate for the anticipated compression due to the lower charge of the battery.

The environmental sensor unit 93 can also provide a frequency information signal 104 to provide information on the operating (i.e. transmission) frequency of the wireless device radio signals 62 to the power supply level adjustment generator 38. The operating frequency can be obtained from the baseband device 20 or the up-conversion block 22. As in the case of the temperature sensor 94 and the battery condition sensor 98, an ADC may be used to provide the frequency information signal 104 as a corresponding digital frequency information signal.

The power supply level adjustment generator 38 combines the data parameter indication of the baseband outgoing data stream 76 with at least one of the temperature information signal 96, the battery condition information signal 100 and the frequency information signal 104 to determine the power supply level adjustment signal 52. In this case, the power supply level adjustment generator 38 can utilize a multi-dimensional look-up table. To reduce complexity a two-dimensional look-up table may be used. The data parameter indication, temperature information signal 96, battery condition information signal 100 and the frequency information signal 104 are used as indices into the look-up table to look up a value for the power supply level adjustment signal 52. Alternatively, the content of the look-up table can be updated when there are changes in the operating frequency channel or temperature. The effects of frequency and temperature are used to scale the contents of the two-dimensional look-up table by +/− a few dB. In another alternative, there can be a plurality of PAPR mappers, with one PAPR mapper being provided for the temperature information signal, one PAPR mapper being provided for the battery condition information signal and one PAPR mapper being provided for the operating frequency. In this case, the outputs of the PAPR mappers, which are in units of dB, can be added together to obtain the power supply level adjustment signal 52. Logarithmic combination may be used if the amplitude of the outputs of the PAPR mapper are not in dB. In either case, factory calibration is done to determine the effect of the environmental parameters on the power supply level adjustment value. For instance, the device 10 can be put into an environmental chamber and the temperature adjusted to a certain value to determine the effect on the power supply level adjustment value for a certain data parameter value. With regards to battery condition, the level of the battery of the device 10 can be adjusted to different values to determine the effect on the power supply level adjustment value for a certain data parameter value. With regards to operating frequency, the transmission frequency can be varied to determine the effect on the power supply level adjustment value for a certain data parameter value.

The power supply level adjustment signal 52 is typically larger than a nominal value if (a) the data parameter indicates a high data bandwidth for transmission; (b) the temperature increases; or (c) the charge level of the battery decreases. Collectively, the adjustment due to temperature, battery condition and operating frequency can have a substantial effect on the value of the power supply level adjustment signal 52.

The power supply level adjustment generator 38 is configured to provide suitable values for the power supply level adjustment signal 52 for different data types, data modulation and data rate as well as environmental information (i.e. temperature and battery), frequency information. The power supply level adjustment signal 52 is typically on the order of +/−1-3 dB for a temperature variation, +/−1 dB for battery level variation and +/−1-3 dB for a transmission frequency variation.

Figure 5:
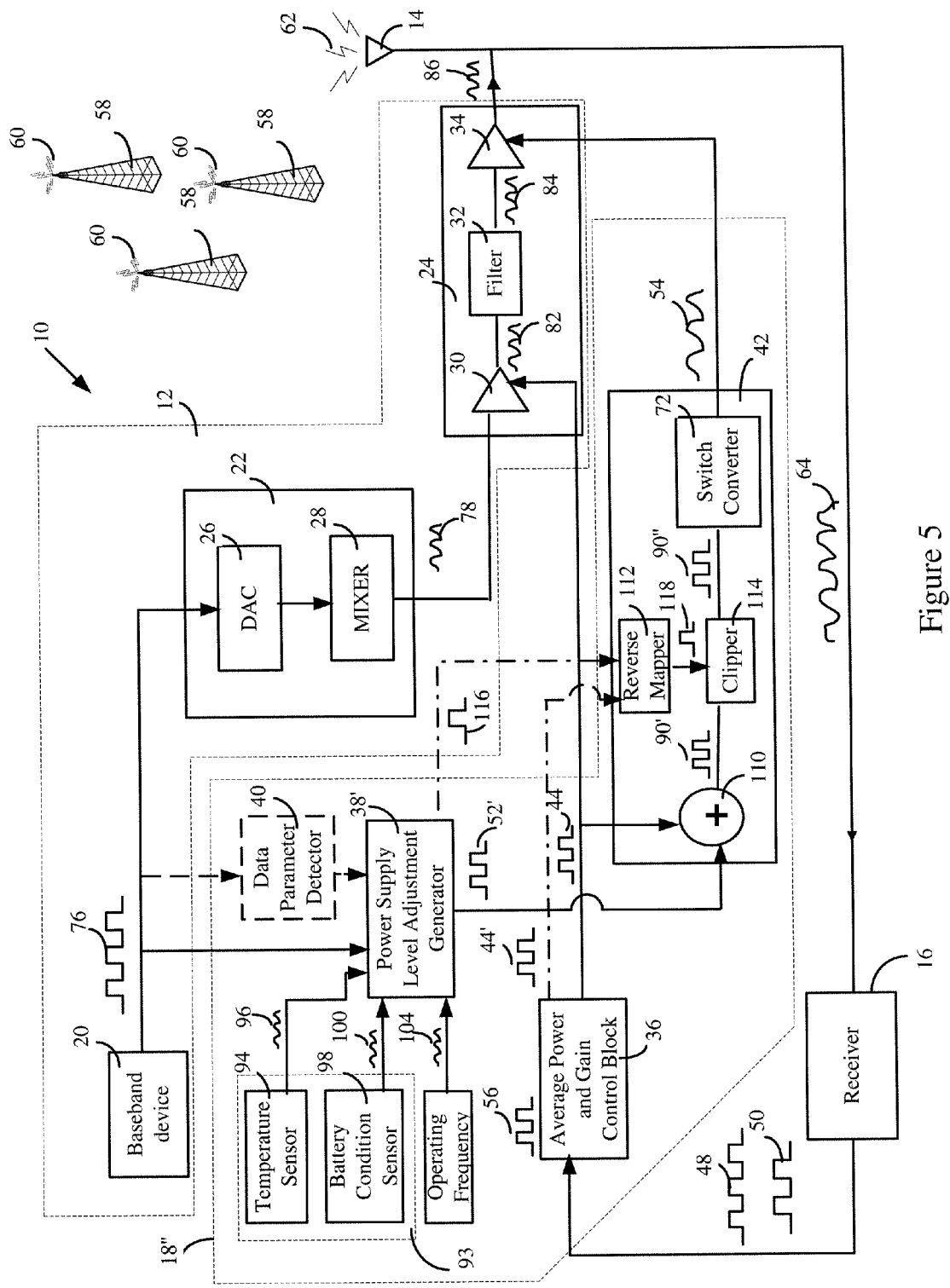
FIG. 5 is a block diagram of another embodiment of a power management system for a wireless communications device.

Some embodiments of the invention may be implemented in a power management system 18" that does not allow access to the average desired transmit power signal 46. FIG. 5 illustrates an alternative embodiment for the power management system 18" in which the average power and gain control block 36 is implemented as a single block. As a result, the average desired transmit power signal 46 is not available as an input for the power supply means 42. In addition, the average power and gain control block 36 operates as a hybrid of a lookup table and an interpolator. The power control instruction signal 48 and the received signal strength indicator signal 50 indicate a desired average supply power level as described previously. The average power and gain control block 36 provides the gain control signal 44 in response to the desired average supply power level.

In this case, the power supply means 42 comprises a summer 110, a reverse mapper 112, a clipper 114 and the switch converter 72. The summer 110 receives the gain control signal 44 and an altered version of the power supply level adjustment signal 52' to provide a first power control signal 90'. The altered version of the power supply level adjustment signal 52' is provided by the power supply level adjustment generator 38' so that the power supply level adjustment signal 52' can be directly summed with the gain control signal 44. Typically, the gain control signal 44 has units of Volts and the power supply level adjustment signal 52 has units of dB so that these two signals cannot be directly summed together. Accordingly, the power supply level adjustment generator 38' scales the power supply level adjustment signal 52 to provide the altered signal 52'. In particular, the scaling is done based on the generation of the gain control signal 44 in the average power and gain control block 36 which depends on parameters that define the look-up table in the average power and gain control block 36. These parameters are known prior to the commercial use of the wireless communications device 10 and hence are available for use in the power supply level adjustment generator 38'.

The first power control signal 90' is then provided to the clipper 114 which has a positive and negative saturation value and a slope that connects these two values. The clipper 114 operates on the first power control signal 90' to provide a second power control signal 90" to the switch converter 72. The switch converter 72 then generates the variable power supply signal 54 as previously described. A DAC may also be used as described previously.

The clipper 112 may clip the first power control signal 90' or attenuate/compress the first power control signal 90' according to the slope, based on the magnitude of the first power control signal 90'. The positive and negative saturation values and the slope of the clipper 112 can be varied in response to the operation of the power management system 118". In particular, the look-up table that is used in the average power and gain control block 36 and the environmental information 116 that is provided by the environmental sensor unit 93 via the power supply level adjustment generator 38' can be used to vary the positive and negative saturation values and the slope of the clipper 112. In particular, the environmental information 116 and an altered version of the gain control signal 44' are provided to the reverse mapper 112 which then provides a clipper adjustment signal 118 to the clipper 114. The contents of the signal 44' are derived from the data in the look-up table of block 36. The connection lines are shown as dash-dotted lines since the adjustment of the clipper due to the signals 44 and 116 occurs at a slower rate compared to the rate of change of the power supply level adjustment signal 52'. In particular, the modification occurs when there is a change in the look-up table used in block 36 or when there is a substantial change in the environmental information 116 (i.e. there is a drastic change in temperature or a hand-off in transmission frequency). For instance, the maximum saturation value is related to operating frequency. The clipper 114 is modified in this fashion to optimize the variable power supply signal 54 and hence the power savings in the power amplifier 34. The summer 110, clipper 114 and the switch converter 72 are preferably implemented via hardware and the reverse mapper 112 is preferably implemented via software, although other implementations for these blocks is possible.

Figure 6:
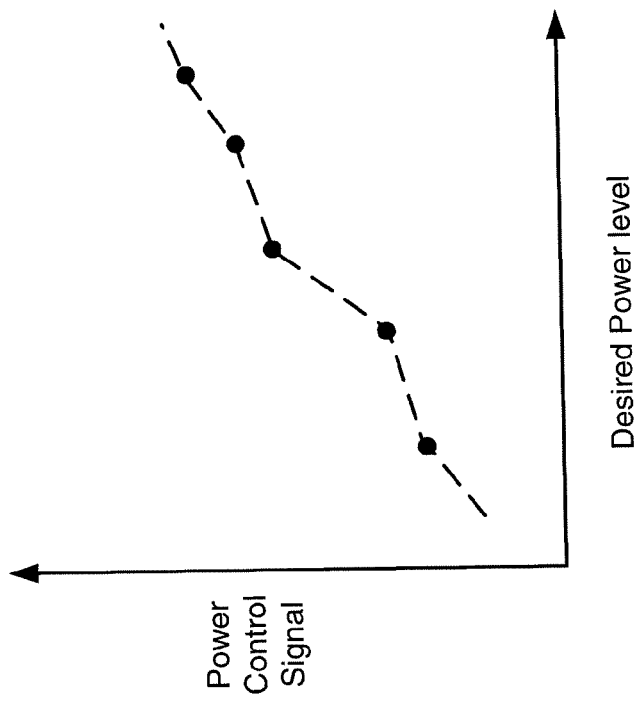
FIG. 6 is a graph illustrating the relationship between a desired power level and a power control signal according to the embodiment of FIG. 5.

FIG. 6 illustrates the operation of the average power and gain block 36. As the average desired power supply level rises and falls, the average power and gain control block 36 either selects a pre-determined value (identified by solid dots) or interpolates between pre-determined values to calculate a value for gain control signal 44. Preferably, the average power and gain control block selects the closest pre-determined value when generating the gain control value 44 to avoid interpolation errors. In practice, the range associated with FIG. 6 is about −52 to 26 dBm. The pre-determined values are programmed into the average power and gain block 36 by a manufacturer, vendor or operator of the wireless communications device 10.

The power management system 18" provides a practical implementation of the invention that may be used with commercially available baseband chipsets in a device in which the average desired transmit power signal 46 is not available as an input to the power supply means 42.

In each of the embodiments of the invention shown herein, the PAPR mapper may provide a value for the power supply level adjustment signal every 20 ms. In some cases, a value for the power supply level adjustment signal may be provided every 5 ms. Further, in some cases, it is preferable to update the supply voltage of the power amplifier 34 every 1.25 ms to guarantee that the ACPR (adjacent channel power ratio) limits are never violated. In addition, the mapping that is performed by the power supply level adjustment generator 38 is such that the transition from a low power supply voltage to a high power supply voltage for the power amplifier 34 is a consistent and smooth function of the desired average power level to reduce non-linearities that are introduced by the various embodiments of the power management system 18.

As shown in FIG. 3, the power supply control block 70 applies a linear transformation to a combination of the average desired transmit power signal 46 and the power supply level adjustment signal 52. The transformation is applied via a look-up table or via an equation. The equation can be implemented in software or hardware. The exact shape of the transformation is adjusted to tune performance and production yield. Accordingly, the power supply control block 70 is preferably calibrated before use.

Figure 7A:
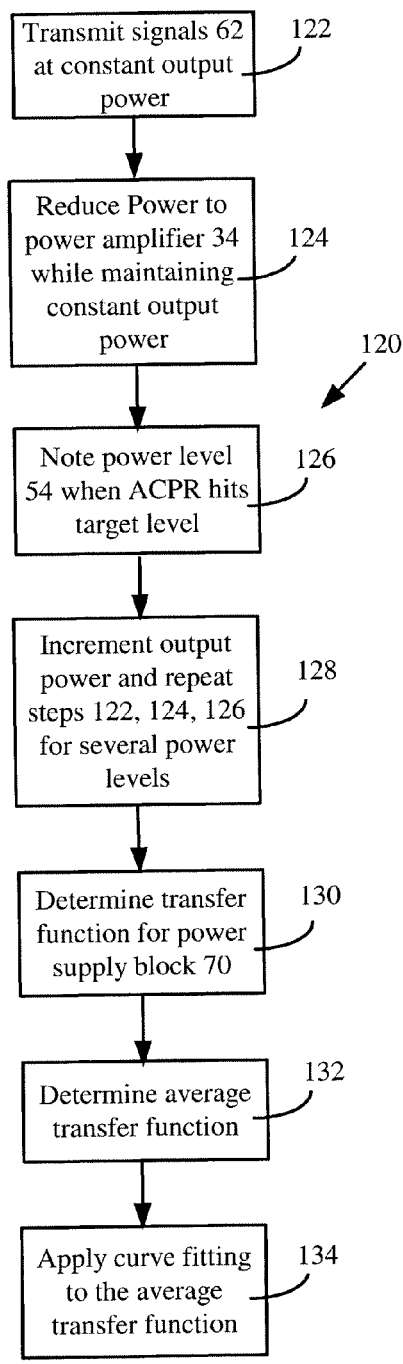
FIG. 7a is flow chart showing the steps of a first calibration method used to calibrate the power management system; and, FIG. 7b is a flow chart showing the steps of a second calibration method used to calibrate the power management system.

Referring now to FIG. 7a, shown therein is a flowchart showing the steps of a power supply block calibration method 120. The calibration is done at a given reference temperature, and a given reference battery condition that are arbitrarily chosen. The baseband device 20 is configured to transmit at an arbitrarily chosen reference transmission frequency. The power supply level adjustment value generator 38 is then configured such that the contributions from the reference temperature, reference battery condition and reference frequency is set to zero. The first step 122 of the calibration method is to transmit the wireless device radio signals 62 at a constant power level while the ACPR is monitored. The next step 124 is to reduce the magnitude of the variable power supply signal 54 to the power amplifier 34 while maintaining constant output power in the wireless device radio signals 62. This is done by increasing the input drive to the power amplifier 34 as the supply voltage to the power amplifier 34 is decreased to maintain constant output power. The next step 126 is to note the magnitude of the variable power supply level signal 54 when the ACPR has increased to a pre-specified design target. The ACPR is defined as the ratio of the power at 1.25 MHz offset within a 30 kHz bandwidth to the power in the carrier. As the linearity of the power amplifier 34 is reduced by starving its power supply the compression artifacts increase. The next step 128 in the calibration method 120 is to increase the output power of the wireless device radio signals 62 and to repeat steps 122, 124 and 126. The step size that is used to determine the next power level depends on the implementation of the power amplifier 34 and those skilled in the art will understand how to select the step size. Step 128 is repeated for several output power levels. The number of output power levels that are used for calibration depends on the implementation of the power amplifier. Typically, three, well-spaced output power levels can be used for calibration.

The next step 130 is to use the control curves of the switching converter 72 and the minimum voltage level 92 to compute an ideal transfer function that is required to derive the digital power signal 90 for controlling the switch converter 72. The ideal transfer function is related to the look-up table used in the average power and gain control block 36 or the gain control block 68. The construction of the look-up table was previously described. The next step 132 is to repeat steps 122 to 130 for several different wireless communication devices to obtain an average transfer function.

The next step 134 is to perform curve fitting on the average transfer function. One way to accomplish this is by fitting a linear line to the average transfer function by adjusting the slope and the intercept of the straight line to fit the average transfer function with minimal error. The slope that is determined is used by the power supply control block 70 as one of the parameters for varying the power supply bias voltage, the ramp slope or the idle bias current. The intercept is set by the breakeven power of the output amplifier block 24 which is the point at which further reduction in the variable power supply signal 54 to the power amplifier 34 (and consequently gain) causes the earlier stages in the output amplifier block 24 to use so much additional power that the total power consumption of the wireless communications device 10 is increased. The intercept coincides with the minimum voltage level 92. The parameters determined by curve fitting is then used to create a look-up table for the power supply block 70.

Figure 7B:
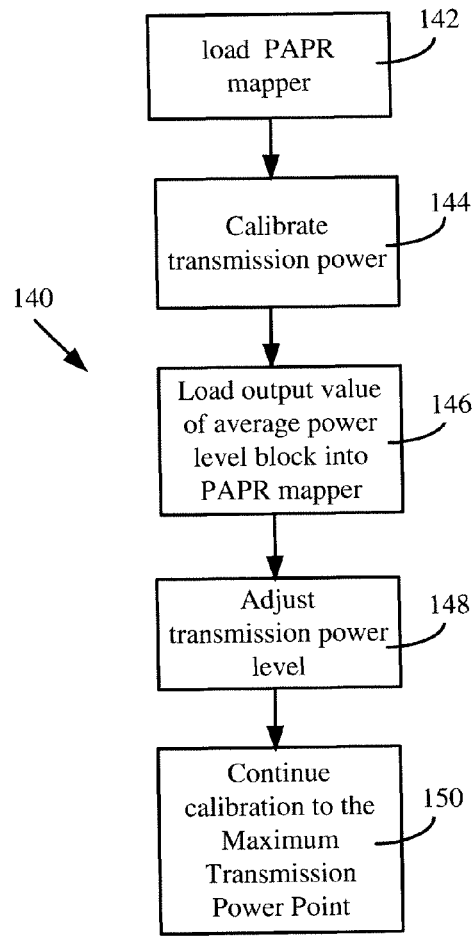

Referring now to FIG. 7b, shown therein is a flowchart showing the steps of a power supply level adjustment generator calibration method 140. The calibration method 140 is preferably performed on a per device basis during factory calibration to account for variations in production tolerance and deviations from the average transfer function model that was obtained for the power supply control block 70. The first step 142 of the calibration method 140 is to load the power supply adjustment level generator 38 with a value that causes the switching converter 72 to operate at its minimum output voltage. This allows the calibration method 140 to start at the lowest transmission power point of the wireless communications device 10.

The next step 144 is to calibrate the transmission power using the usual procedure according to the transmission power point defined in step 142. The usual procedure involves increasing the automatic gain control of the device 10 over a predefined "safe" range and recording the transmitter output power. Preferably, half of the range is calibrated first. This is done until the output power of the wireless communications device slightly exceeds a target power as determined for the set supply voltage. The target power is obtained during characterization of the wireless communication device 10 as is commonly known to those skilled in the art. The characterization will depend on the manufacturer of the components of the output power amplifier block 24. The target power is the breakeven point that is determined by reducing the power supply level to the power amplifier 34 and determining the point at which the pre-drive circuitry consumes so much power that the savings in power amplifier power dissipation (by reducing headroom) is mitigated.

The next step 146 is to interpolate the output value of the average power and gain control block 36 and load this interpolated output value, after appropriate adjustment by the reverse mapper 112, into the power supply level adjustment generator 38. The next step 148 is to adjust the transmission power level to a value that is slightly below the target power.

The next step 150 is to increase the value of the transmission power level and repeat steps 142 to 148 of the calibration method 140. The calibration method 140 is continually repeated until a maximum specified transmission power point is reached.

The invention has been described here by way of example only. Various modification and variations may be made to these exemplary embodiments without departing from the spirit and scope of the invention, which is limited only by the appended claims.

We claim:

1. A power management system for a transmitter of a wireless device, the transmitter comprising a power amplification block for generating an amplified transmission signal, and the power management system comprising:

an environmental sensor unit for providing at least one environmental information signal representing an operating environment of the mobile device; and a power supply level adjustment generator configured to receive the at least one environmental information signal and to generate a power supply level adjustment signal by combining power supply level adjustment values stored in a plurality of look-up tables comprising one look-up table for each of the at least one environmental information signal and a data parameter indicator of a baseband outgoing data stream to be transmitted by the wireless device, the power supply level adjustment signal for combining with an average desired transmit power signal representing an average transmit power of the amplified transmission signal to generate a variable power supply signal for the power amplification block.

2. The power management system of claim 1, wherein the environmental sensor unit comprises at least one of:

a temperature sensor for providing a temperature information signal representing a hardware temperature in the wireless device; or a battery condition sensor for providing a battery condition information signal representing a charge level of a battery used to power the wireless device.

3. The power management system of claim 1, wherein the environmental sensor unit is configured to provide a frequency information signal related to a transmission frequency of the baseband outgoing data stream.

4. The power management system of claim 1, wherein the power supply level adjustment generator is further configured to generate an altered version of the power supply level adjustment signal that is combinable with a gain control signal to generate the variable power supply signal, the gain control signal for controlling pre-amplifier gain in the power amplification block.

5. The power management system of claim 1, wherein the power supply level adjustment generator is further configured to generate at least one of the power supply level adjustment values using a corresponding formula.

6. The power management system of claim 1, further comprising a data parameter detector connected to a baseband module of the wireless device and configured to provide the data parameter indicator.

7. A method of managing power in a transmitter of a wireless device, the transmitter comprising a power amplification block for generating an amplified transmission signal, and the method comprising:

generating at least one environmental information signal representing an operating environment of the mobile device;

storing power supply level adjustment values in a plurality of look-up tables comprising one look-up table for each of the at least one environmental information signal and a data parameter indicator of a baseband outgoing data stream to be transmitted by the wireless device;

outputting a power supply level adjustment value from each of the plurality of look-up tables based on the at least one environmental information signal and the data parameter indicator; and combining the power supply level adjustment value outputted from each of the plurality of look-up tables to generate a power supply level adjustment signal for combining with an average desired transmit power signal representing an average transmit power of the amplified transmission signal to generate a variable power supply signal for the power amplification block.

8. The method of claim 7, wherein generating the at least one environmental signal comprises at least one of:

generating a temperature information signal representing a hardware temperature in the wireless device;

generating a battery condition information signal representing a charge level of a battery used to power the wireless device; or generating a frequency information signal representing a transmission frequency of the baseband outgoing data stream.

9. The method of claim 7, further comprising:

generating an altered version of the power supply level adjustment signal; and combining the altered version of the power supply level adjustment signal with a gain control signal to generate the variable power supply signal for the power amplification block, the gain control signal for controlling pre-amplifier gain in the power amplification block.

10. The method of claim 7, further comprising using a corresponding formula to provide at least one of the power supply level adjustment values combined to generate the power supply level adjustment signal.

11. The method of claim 7, further comprising detecting the data parameter indication based on at least one of a data type, data modulation or data rate of the baseband outgoing data stream.

12. A power management system for a transmitter of a wireless device, the power management system comprising:

a power supply level adjustment generator configured to generate a power supply level adjustment signal by combining power supply level adjustment values stored in a plurality of look-up tables comprising one look-up table for each of at least one environmental information signal representing an operating environment of the mobile device and a data parameter indicator of a baseband outgoing data stream to be transmitted by the wireless device; and a power supply module configured to receive the power supply level adjustment signal and to generate a variable power supply signal.

13. The power management system of claim 12, wherein the transmitter comprises a power amplification block for generating an amplified transmission signal;

wherein the power supply module is configured to generate the variable power supply signal by combining the power supply level adjustment signal with an average desired transmit power signal that represents an average transmit power of the amplified transmission signal; and wherein the power supply module is configured to provide the variable power supply signal to the power amplification block.

14. The power management system of claim 13, wherein the at least one environmental information signal comprises:

a temperature information signal related to a hardware temperature in the wireless device;

a battery condition information signal related to a battery used to power the wireless device; or a frequency information signal related to a transmission frequency of the transmission signal.

15. The power management system of claim 13, wherein the power supply module comprises:

a power supply control block configured to provide a power control signal based on the average desired transmit power signal and the power supply level adjustment signal; and a switch converter connected to the power supply control block and configured to generate the variable power supply signal in response to the power control signal.

16. The power management system of claim 13, wherein the power supply module is configured to maintain the variable power supply signal above a minimum voltage level of the power amplification block.

17. The power management system of claim 12, wherein the power supply level adjustment generator is further configured to generate an altered version of the power supply level adjustment signal for combining with a gain control signal used to control pre-amplifier gain in the power amplification block.

18. The power management system of claim 17, wherein the transmitter comprises a power amplification block for generating an amplified transmission signal;

wherein the power supply module is configured to generate the variable power supply signal by combining the altered version of the power supply level adjustment signal with a gain control signal for controlling pre-amplifier gain in the power amplification block; and, wherein the power supply module is configured to provide the variable power supply signal to the power amplification block.

19. The power management system of claim 18, wherein the power supply module comprises:

a summer configured to generate a first power control signal by summing together the altered version of the power supply level adjustment signal and the gain control signal;

a clipper configured to receive the first power control signal and generate a second power control signal; and a switch converter coupled to the clipper and configured to generate the variable power supply signal in response to the second power control signal.

20. The power management system of claim 19, wherein the power supply module further comprises a reverse mapper configured to generate a clipper adjustment signal based on the one or more environmental parameters of the wireless device and an altered version of the gain control signal, the clipper adjustment signal for adjusting at least one of positive saturation values, negative saturation values, or slope of the clipper.

21. A power supply level adjustment generator for a power supply module of a transmitter of a mobile device, the power management system comprising:

a plurality of look-up tables storing power supply level adjustment values for the power supply module, each look-up table indexed by one of a corresponding plurality of parameters comprising one or more environmental parameters of the wireless device and a data parameter indicator of a baseband outgoing data stream to be transmitted by the wireless device; and an adder configured to generate a power supply level adjustment signal by adding together a power supply level adjustment value outputted from each of the plurality of look-up tables, the power supply level adjustment signal for combining with an average desired transmit power signal to generate a variable power supply signal for a power amplification block using the power supply module.

* * * * *